United States Patent [19]

Glasheen et al.

[11] Patent Number: 5,763,888
[45] Date of Patent: Jun. 9, 1998

[54] HIGH TEMPERATURE GAS STREAM OPTICAL FLAME SENSOR AND METHOD FOR FABRICATING SAME

[75] Inventors: William M. Glasheen, Derry, N.H.; Deidre E. Cusack, Groton, Mass.; Helmar R. Steglich, Marblehead, Mass.; George P. Sacco, Wakefield, Mass.

[73] Assignee: Ametek Aerospace Products, Inc., Wilmington, Del.

[21] Appl. No.: 380,644

[22] Filed: Jan. 30, 1995

[51] Int. Cl.$^6$ .................................................. G01J 3/00
[52] U.S. Cl. ................................... 250/372; 250/55.4
[58] Field of Search ............................... 250/372, 373, 250/554, 227.23, 339.15

[56] References Cited

U.S. PATENT DOCUMENTS

| | | | |
|---|---|---|---|
| 4,039,844 | 8/1977 | MacDonald | 250/554 |
| 4,043,742 | 8/1977 | Egan et al. | 431/12 |
| 4,179,606 | 12/1979 | Nakauchi et al. | 250/339 |
| 4,510,794 | 4/1985 | Couch | 73/116 |
| 4,750,142 | 6/1988 | Akiba et al. | 364/550 |
| 4,887,574 | 12/1989 | Kuroiwa et al. | 123/425 |
| 4,919,099 | 4/1990 | Extance et al. | 123/425 |
| 4,930,478 | 6/1990 | Plee et al. | 123/425 |
| 4,934,926 | 6/1990 | Yamazaki et al. | 431/75 |
| 4,940,033 | 7/1990 | Plee et al. | 123/425 |
| 4,988,884 | 1/1991 | Dunbar et al. | 250/554 |
| 5,024,055 | 6/1991 | Sato et al. | 60/39.27 |
| 5,037,291 | 8/1991 | Clark | 431/12 |
| 5,067,463 | 11/1991 | Remboski et al. | 123/425 |
| 5,093,576 | 3/1992 | Edmond et al. | 250/370.1 |
| 5,113,828 | 5/1992 | Remboski et al. | 123/425 |
| 5,125,381 | 6/1992 | Nutton et al. | 123/425 |
| 5,148,667 | 9/1992 | Morey | 60/39.02 |
| 5,186,146 | 2/1993 | Sohma et al. | 123/435 |
| 5,222,887 | 6/1993 | Zabielski, Sr. | 431/12 |
| 5,236,328 | 8/1993 | Tate et al. | 431/14 |
| 5,245,196 | 9/1993 | Cabalfin | 250/554 |
| 5,257,496 | 11/1993 | Brown et al. | 60/39.06 |
| 5,277,496 | 1/1994 | Mayer et al. | 374/130 |
| 5,303,684 | 4/1994 | Brown et al. | 123/435 |
| 5,332,386 | 7/1994 | Hosome et al. | 431/12 |
| 5,378,642 | 1/1995 | Brown et al. | 437/40 |
| 5,385,855 | 1/1995 | Brown et al. | 437/41 |
| 5,467,185 | 11/1995 | Engeler et al. | 356/44 |
| 5,480,298 | 1/1996 | Brown | 431/79 |
| 5,487,266 | 1/1996 | Brown | 60/39.06 |

FOREIGN PATENT DOCUMENTS

| | | |
|---|---|---|
| 56-92326 | 7/1981 | Japan. |
| 61-197726 | 9/1986 | Japan. |

OTHER PUBLICATIONS

Beer et al; "Individual Burner Air/Fuel Ratio Control Optical Adaptive Feedback Control System"; Jan. 1982; 1–62 &A1–49; MIT Energy Laboratory Report No. MIT-EL 82-001.

Brown etal; "Silicon Carbide UV Photodiodes"; Feb. 1993; pp. 325–333; IEEE Transactions on Electron Devices vol. 40, No. 2.

Fraim; "Research into a Spectral Flame Analyzer Phase 1"; Jun. 1, 1985; pp. 1–81; Thermo Electron Corporation; Technical Information Center, US Department of Energy.

*Primary Examiner*—David P. Porta
*Assistant Examiner*—Richard Hanig
*Attorney, Agent, or Firm*—Hayes, Soloway, Hennessey, Grossman & Hage, P.C.

[57] ABSTRACT

A high temperature gas stream optical flame sensor for flame detection in gas turbine engines, and method for fabricating same is provided. The sensor generally comprises a silicon carbide photodiode and silicon carbide based amplification hardware for generating a signal indicative of the presence of the flame. In a preferred embodiment, the photodiode and amplification hardware are disposed within a sensor housing and the photodiode is situated within a fuel/air premixer.

13 Claims, 13 Drawing Sheets

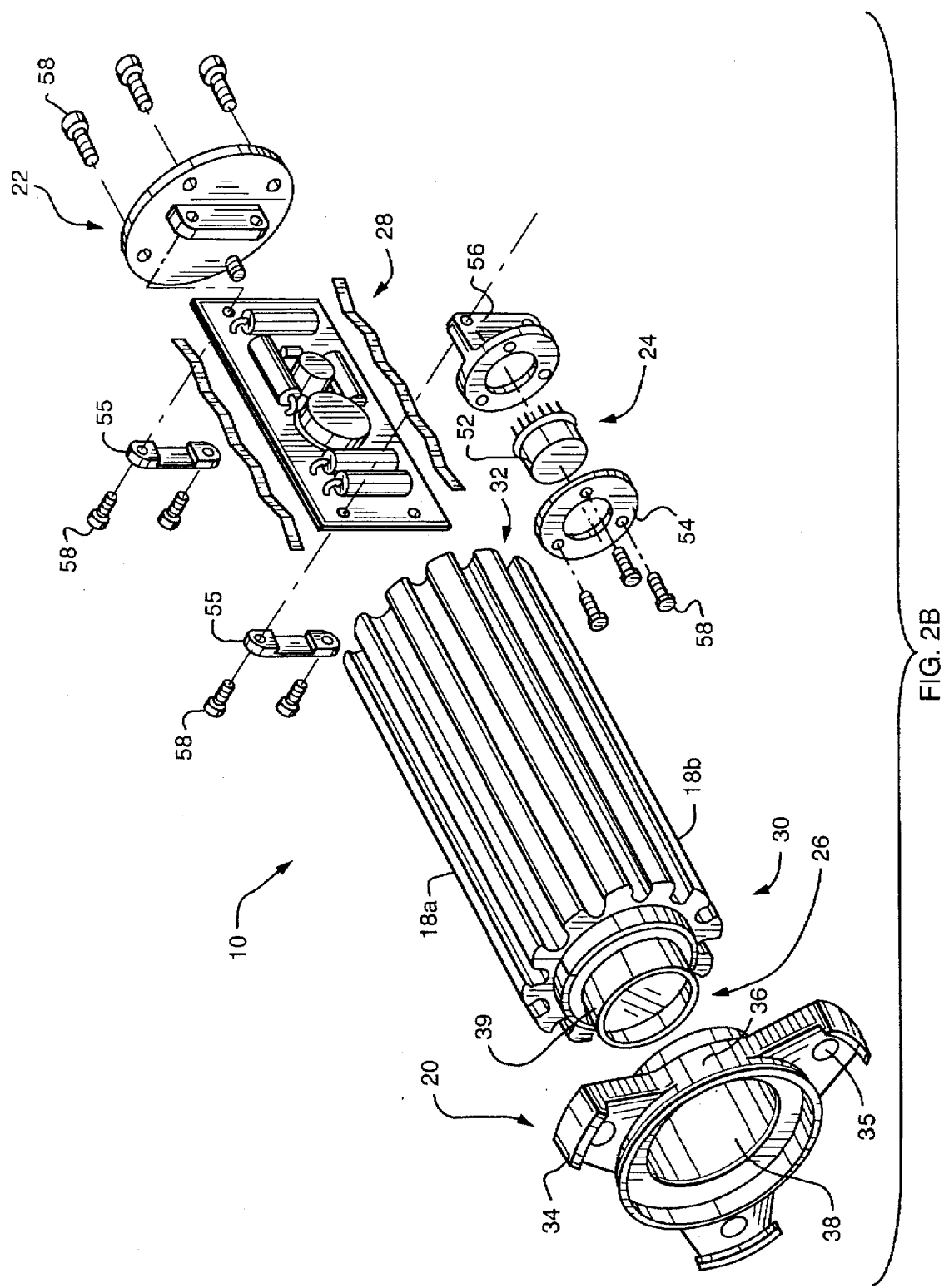

HIGH TEMPERATURE GAS STREAM OPTICAL FLAME SENSOR AND METHOD FOR FABRICATING SAME

BACKGROUND OF THE INVENTION

1. Field of the Invention

This invention relates generally to an optical sensor for flame detection, and more particularly, to a high temperature silicon carbide based sensor for use in gas turbine engines for detecting the presence of a combustion flame and/or an afterburner flame.

2. Brief Description of Related Prior Art

The most common method for flame detection in gas turbine engines, either for aircraft and marine propulsion or for land based power generation, is by a light activated or photosensitive gas-tube discharge detector. Such detector consists of a phototube having a cathode which is photo-emissive (i.e. it emits electrons when illuminated), and an anode for collecting the electrons emitted by the cathode. The tube is filled with a gas at low pressure which is ionized by any accelerated electrons. A large voltage potential is applied to and maintained between the cathode and the anode such that in the presence of a flame, photons of a given energy level illuminate the cathode and cause electrons to be released and accelerated by the electric field, thereby ionizing the gas and causing amplification until a much larger photocurrent measured in electrons is produced. If the electrical field is continually maintained, the device will conduct electrons even when the photons stop, until the metal surfaces are depleted, thus functioning in a manner similar to the "start circuit" of a gas discharge lamp. To ensure tube longevity and to prevent faulty "on" indications, a large AC voltage is applied through a resistor/inductor circuit to the sensor. In this manner, the device acts like a single wave rectifier since the tube only conducts when both the voltage is high and photons are present. When the voltage drops, the tube stops conducting and will not conduct any further photocurrent until the next time it is illuminated in the presence of photons. Although such an apparatus is well proven, having been used reliably for many years in a wide range of applications, specifically with gas turbine engines, it has several drawbacks.

Typically, a very large AC potential in excess of 200 volts is required. This equates to a power drain of approximately 7 watts, by far the largest energy user of all engine sensors. Moreover, such an apparatus suffers from degraded performance when the surrounding temperatures exceed 400 degrees Fahrenheit due to changes in the properties of the metal components at such elevated temperatures. Accordingly, some gas turbine engines require the use of specifically dedicated cooling equipment to maintain the sensor temperature at acceptable levels. Such collateral cooling systems, however, place additional demands on the system, and add to its cost, weight, and complexity, and decrease its reliability.

Another system for flame detection, specifically for detecting the presence of an afterburner flame in augmented gas turbine engines, is disclosed in U.S. Pat. No. 4,510,794 to Couch. The Couch system relies on an ion/electrostatic probe which provides ionic flame detection and electrostatic engine wear monitoring by measuring the conductivity through the plasma of the afterburner flame.

As modern electronic systems have replaced archaic tube-based hardware with semiconductor components, photodiodes have been implemented in applications for measuring or detecting the presence of light throughout the visible and ultraviolet spectrum. Their smaller size, greater stability, enhanced reliability and lower cost make them vastly superior to the phototube.

The photodiode is a p-n junction device with an associated depletion region wherein an electric field separates photogenerated electron-hole pairs, the movement of which generates measurable current. When actinic electromagnetic radiation strikes the semiconductor material, the electron-hole pairs are generated. When these charge carriers are generated near a p-n junction, the electric field of the depletion layer at the junction separates the electrons from the holes in the normal p-n junction fashion. This separation produces a short circuit or open circuit voltage, technically referred to as the photovoltaic effect. Such photodiodes are of the type disclosed in U.S. Pat. No. 5,093,576 to Edmond et al.

U.S. Pat. Nos. 5,303,684 and 5,257,496, both to Brown et al, disclose a combustion control system for controlling the level of $NO_x$ emissions produced in the combustion process to reduce such emissions while maintaining a sufficiently high combustion flame temperature. This is achieved by monitoring the intensity of ultraviolet spectral lines associated with the combustion flame, and then dynamically adjusting the fuel/air ratio of the fuel mixture. These patents describe in a general sense the use of silicone carbide (SiC) photodiodes to measure light intensity in a system for generating a signal correlating to the $NO_x$ emission concentration for adjustment of engine operating parameters. However, these patents do not disclose specific sensor structures and methods for fabricating same that are reliable in and for use in the high temperature environment near the combustion section or afterburner section of a gas turbine engine, wherein the engine surface temperature may reach 550 degrees Celsius for extended periods of time, in which environment the sensors are intended to operate.

Accordingly, it is an object of a present invention to provide an optical flame sensor comprised of a silicon carbide detector and silicon carbide amplification circuitry in a unitary assembly for attachment to the wall of a gas turbine engine.

It is yet another object of the present invention to provide an optical flame sensor designed to operate for extended periods of time in a high temperature environment without the need for additional cooling equipment.

It is still another object of the present invention to provide an optical flame sensor of compact and light weight construction and enhanced reliability.

It is yet another object of the present invention to provide an optical flame sensor for detecting the presence of afterburner light-off in afterburning gas turbine engines, wherein the sensor contains optical filtering means for rejecting electromagnetic radiation in excess of 280 nanometers to eliminate false indications caused by incident solar radiation.

It is a further object of the present invention to provide an optical flame sensor disposed within the center-body fairing of a fuel/air premixer in an aeroderivative gas turbine engine.

It is another object of the present invention to provide a method for fabricating an optical flame sensor that is especially adapted to permit the sensor to operate for prolonged periods in high temperature environments without degradation in performance of the sensor.

SUMMARY OF THE INVENTION

In accordance with the above objects and additional objects which will become apparent hereinafter, the present invention provides multiple preferred embodiments of a high temperature gas stream optical flame sensor.

In one embodiment the sensor of the present invention is comprised of a generally elongated housing having an internally disposed detector assembly, amplifier assembly and optical assembly. The detector assembly includes a detector housing having a suitable optical element or lens (e.g. synthetic sapphire or the like) disposed in a window or aperture at one end thereof, and a ceramic header containing a silicon carbine photodiode at the other end thereof.

The amplification circuitry includes a dual JFET silicon carbide transistor preamplifier coupled to the silicon carbide photodiode and a high temperature operational amplifier. The system operates by the application of a positive and negative voltage source (in the preferred embodiment approximately +7.5 and −7.5 volts). When exposed to electromagnetic radiation of wavelength in the spectral range of from about 190 to 400 nanometers, preferably within the ultraviolet range of from about 190 to 270 nanometers, the photodiode generates a proportional photocurrent which is processed and amplified through the operational amplifier to produce an output signal indicative of the presence of the flame.

The incident ultraviolet radiation is directed onto the detector through a lens assembly attached to the housing. This lens assembly is comprised of a lens (e.g. sapphire) disposed in a Kovar lens holder. Such radiation is directed through a second lens (disposed in the detector assembly) and is thereby concentrated onto the photodiode.

In another embodiment the sensor of the present invention includes a detector which is non-collinearly aligned with the optical lens, and further includes a mirrored internally disposed optical block assembly for directing the incident radiation onto the detector. The mirrors may be coated to reject incident radiation in excess of 270 nanometers (e.g. visible light, particularly sunlight) when used for afterburner flame detection where sunlight entering the engine nozzle could trigger false indications of afterburner light-off.

In yet another embodiment the sensor of the present invention is designed to be disposed within the fuel/air premixer of an aeroderivative gas turbine engine. In such an engine, air and fuel are premixed prior to combustion by a plurality of fuel/air premixers. These contain a center-body fairing in which the detector may be situated. To keep the detector components shielded from the extreme temperatures inside the combustion chamber, the incident radiation is communicated to the detector through a fiber-optic cable. In this embodiment, the amplification circuitry is disposed at a remote location and communicates with the detector through a suitable electrical connector attached to the fairing.

In still yet another embodiment of the present invention, a ceramic package assembly having a ceramic substrate is provided. A mounting pad is formed on one surface of the substrate. The SiC photodiode is brazed to the mounting pad, preferably using a braze alloy preform having a composition, by weight, of 56 percent silver, 22 percent copper, 17 percent zinc, and 5 percent tin. Optical means for concentrating electromagnetic radiation is then mounted to the package assembly.

For a fuller understanding of the present invention, reference should be had to the following detailed description and to the accompanying drawings, wherein like numerals depict like parts, and wherein:

BRIEF DESCRIPTION OF THE DRAWINGS

FIG. 2B is exploded isometric view of the sensor shown in FIG. 2A;

DETAILED DESCRIPTION OF THE PREFERRED EMBODIMENTS

Figure 1A:
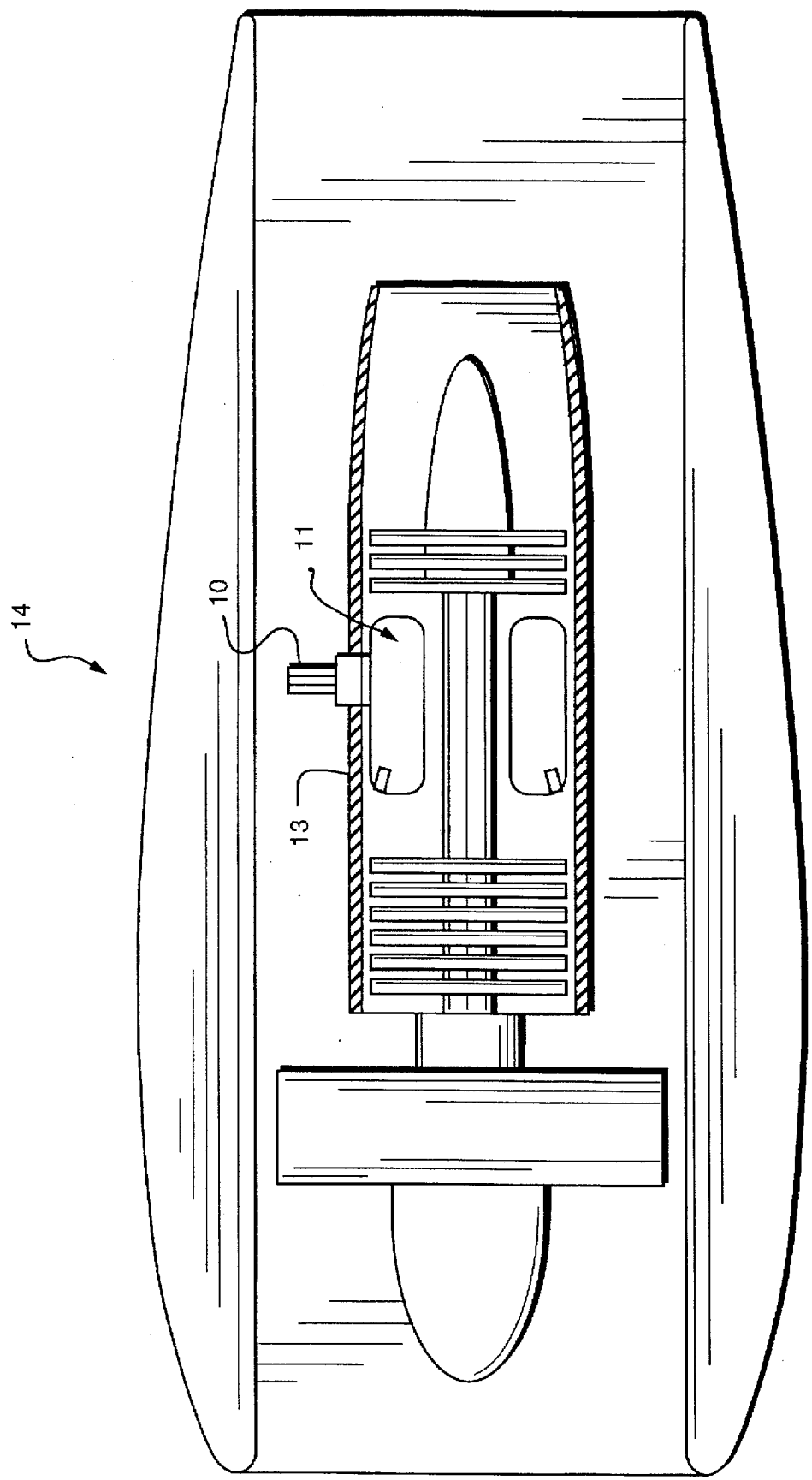
FIG. 1A is a schematic view of a gas turbine engine and a sensor disposed at the combustion section thereof.
Figure 1B:
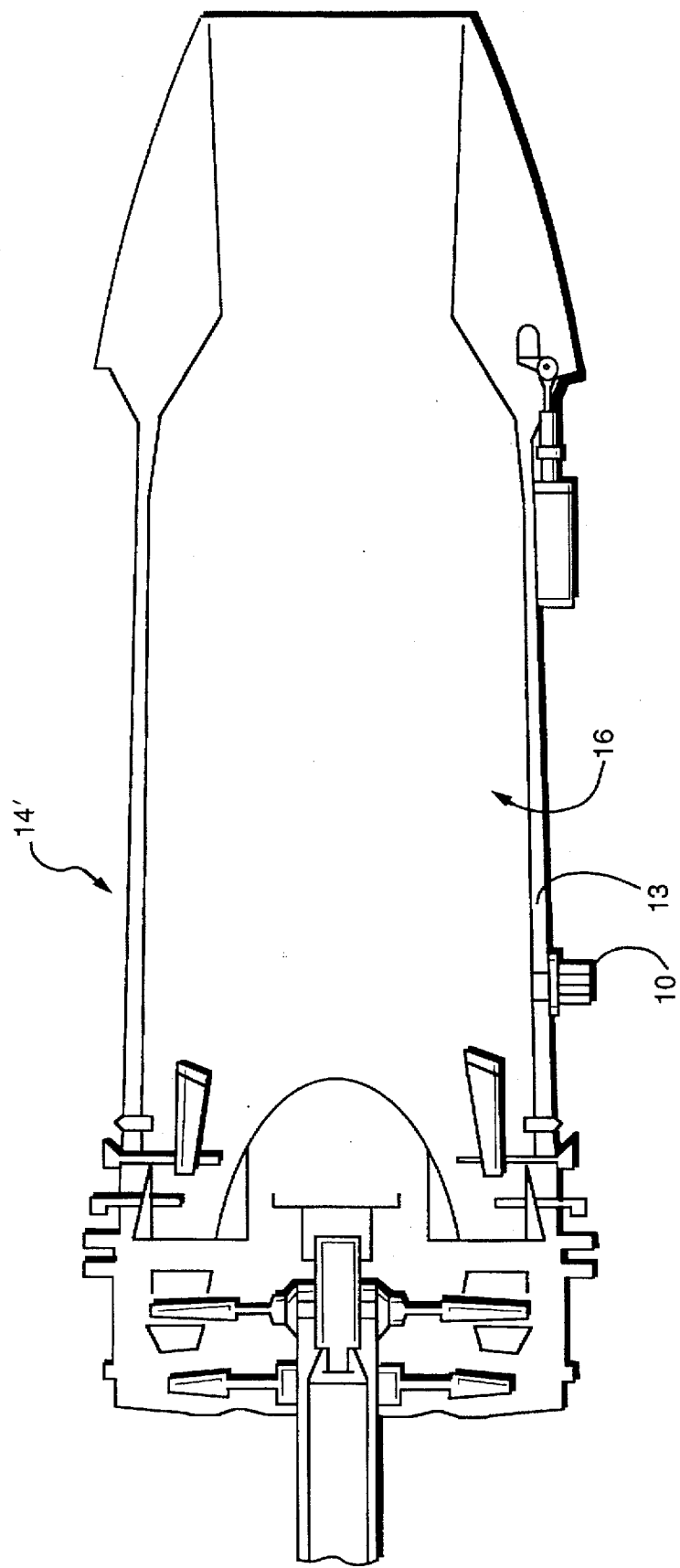
FIG. 1B is a partial schematic view of an augmented gas turbine engine showing a sensor made in accordance with the present invention disposed at the afterburner section thereof.

With reference to the drawings, there is depicted a high temperature gas stream optical flame sensor ("sensor") 10 depicted in exemplary applications for (1) detecting the presence of a flame in the combustion chamber 11 of a gas turbine (e.g. a turbofan) engine 14 (FIG. 1A), and (2) situated proximal to the nozzle section 16 of an augmented afterburning gas turbine engine 14' (FIG. 1B) for determining when afterburner light-off has been achieved or when afterburner shut-down occurs. In either application, the sensor 10 is optically exposed to the flame through a suitable aperture or window in the engine wall 13.

Figure 2A:
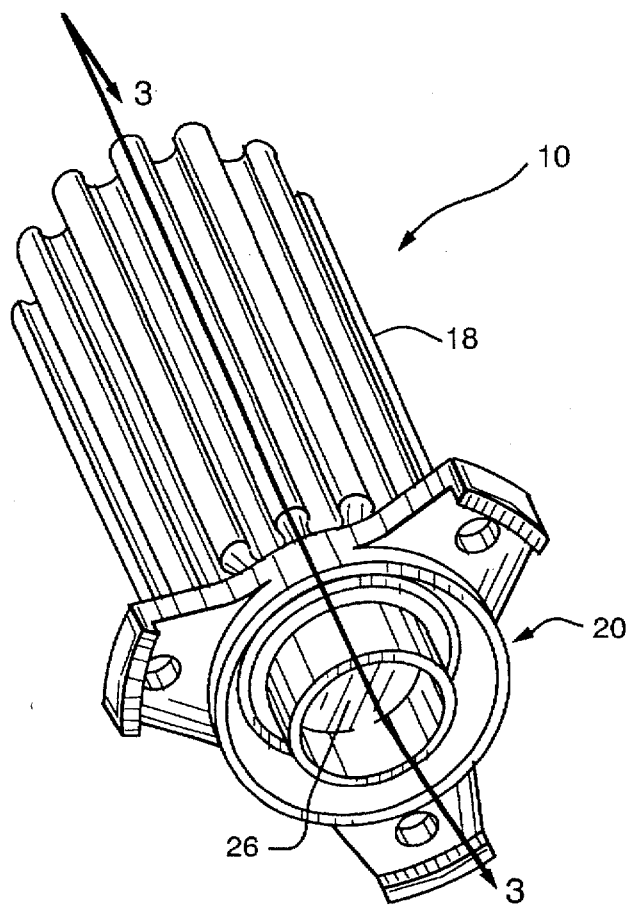
FIG. 2A is an isometric view of one embodiment of a sensor made in accordance with the present invention.

In the embodiment as shown in FIGS. 2A and 2B, sensor 10 is generally comprised of an elongated housing assembly 18, an attachment flange 20, a cover 22, a detector assembly 24, a lens assembly 26, and an electronic amplification assembly 28. The housing assembly 18 may be fabricated from, for example, stainless steel and can be first extruded in two halves 18a, 18b and then machine grooved to provide a plurality of fins to facilitate heat transfer for cooling. The housing halves 18a, 18b may be brazed to each other by conventional techniques to form the final housing assembly. Housing 18 is defined by a first end 30 and a second end 32. The housing 18 generally is configured having an elongated cylindrical shape forming a hollow interior in which the respective detector components and amplification circuitry are disposed as depicted in FIGS. 2B and 3 and described below.

The attachment flange 20 is constructed and arranged to facilitate attachment of the sensor 10 to the engine wall (i.e. in the vicinity of the combustion section and/or the afterburner section) of the gas turbine engine. Flange 20 defines a plurality of ribs 34 which project radially outwards from an integral center hub 36 where the hub defines a centrally disposed aperture 38 therethrough. Each of the ribs 34 include apertures 35 through which conventional fastening means such as screws or the like may be inserted into and retained by the engine wall of the gas turbine engine. The attachment flange 20 fits over and is brazed to the circumferential peripheral surface 39 of housing 18 at the first end 30 thereof. This can be implemented in the same step where the housing halves 18a, 18b are joined.

Figure 3:
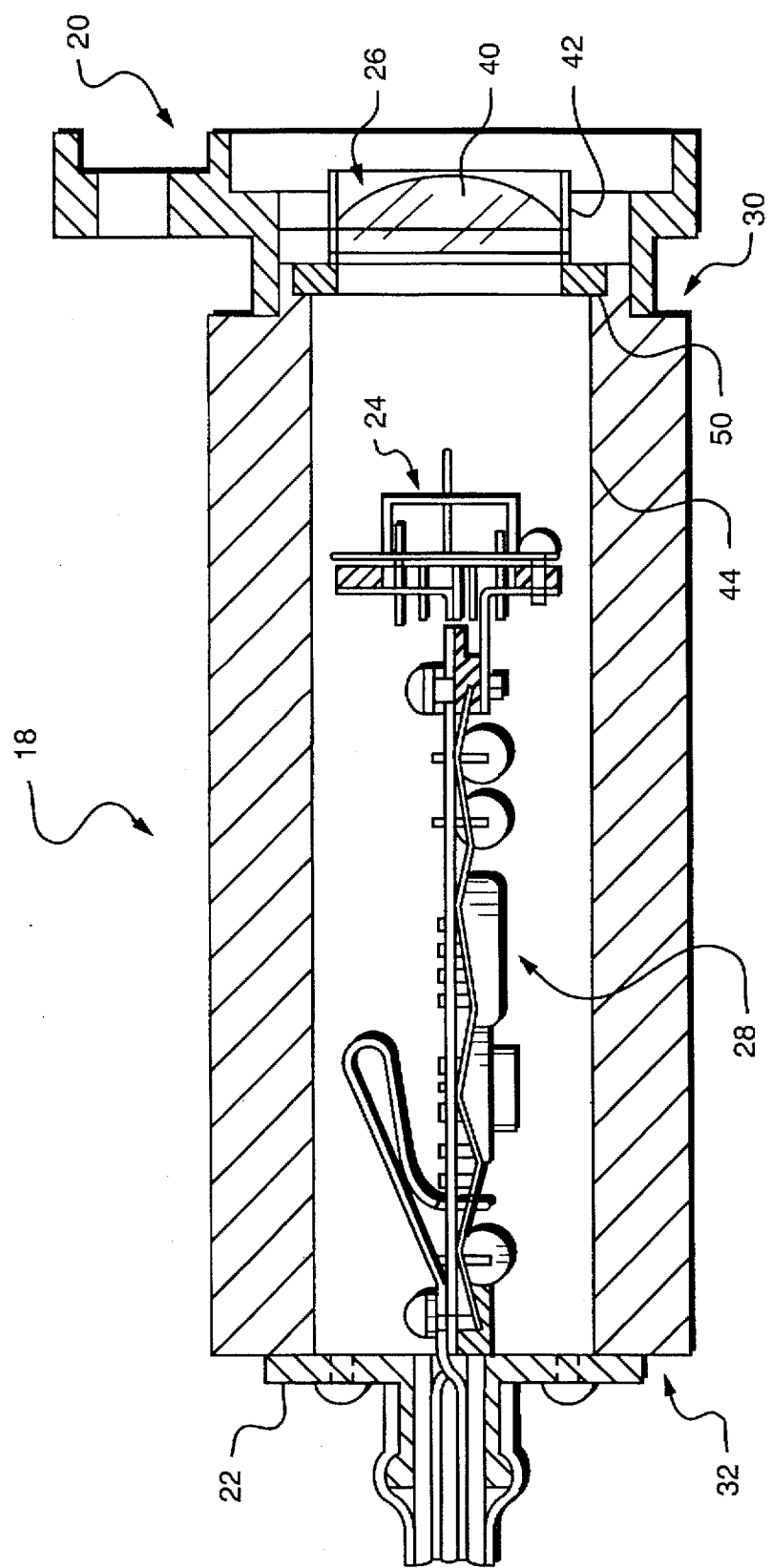
FIG. 3 is a sectional view along lines 3—3 in FIG. 2A.
Figure 4:
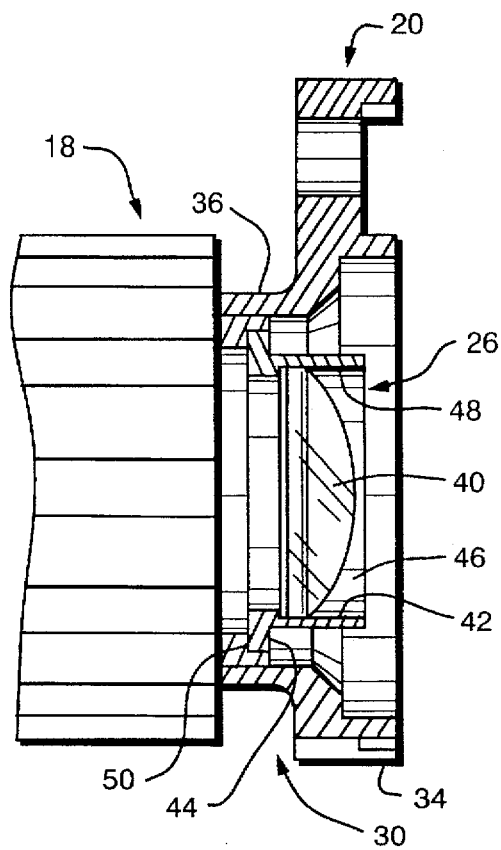
FIG. 4 is a partial sectional view of the optical assembly.

Referring now to FIGS. 2B, 3 and 4, a lens assembly 26 is disposed within housing 18 near the first end 30. Lens assembly 26 includes a lens 40 fabricated from a high temperature optical material transparent to electromagnetic radiation of a spectral frequency in the band width of from about 190 to 400 nanometers, and preferably within the ultraviolet range of from about 190 to 270 nanometers. In the preferred albeit exemplary embodiment, the lens 40 is fabricated from synthetic sapphire ($AL_{203}$) with a maximum thickness of about 6.6 millimeters. The sapphire lens 40 is disposed within a lens holder 42, preferably fabricated from Kovar to accommodate thermal expansion of the sapphire. The lens holder 42 includes a flange 44 and defines a hollow bore therethrough 46 which defines an inner wall 48 against which the lens 40 is brazed in place. The lens holder 42 is attached to the housing 18, for example, by laser welding the flange 44 to the annular cutout 50 defined in the first end 30 of the housing as shown in FIG. 4.

Referring now to FIGS. 2B and 5–7, the detector assembly 24 is generally comprised of a detector 52, a clamp-ring 54 and a detector holder 56. The clamp-ring attaches the detector 52 to the detector holder 56 with a plurality of fasteners 58 in a conventional manner. The detector holder 56 is attached to the electronics 28 with a clamp 55, the assembly of which in turn is attached to the cover 22 of the housing 18 with fasteners 58 and another clamp 55.

Figure 6:
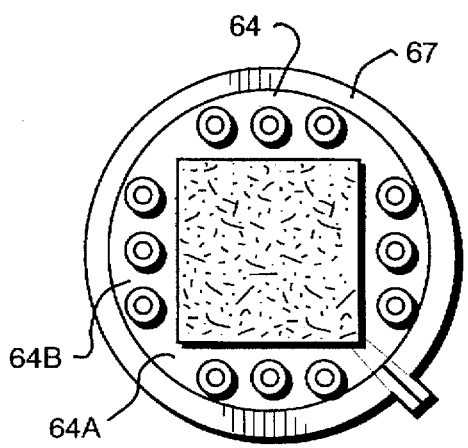
FIG. 6 is a top plan view of the ceramic header.
Figure 7:
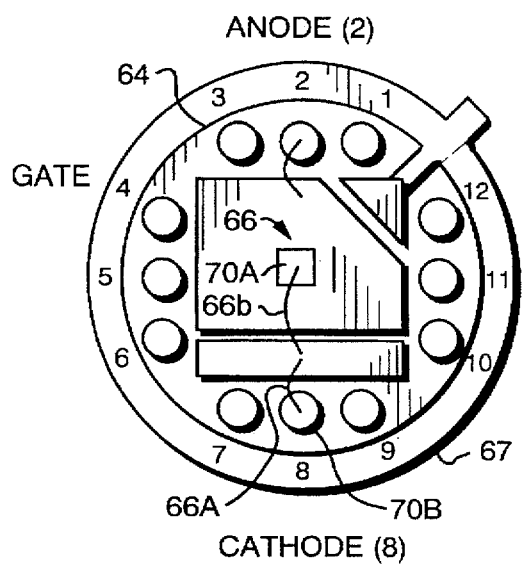
FIG. 7 is a top plan view of ceramic header depicting the photodiode and the electrical connections thereof.
Figure 9:
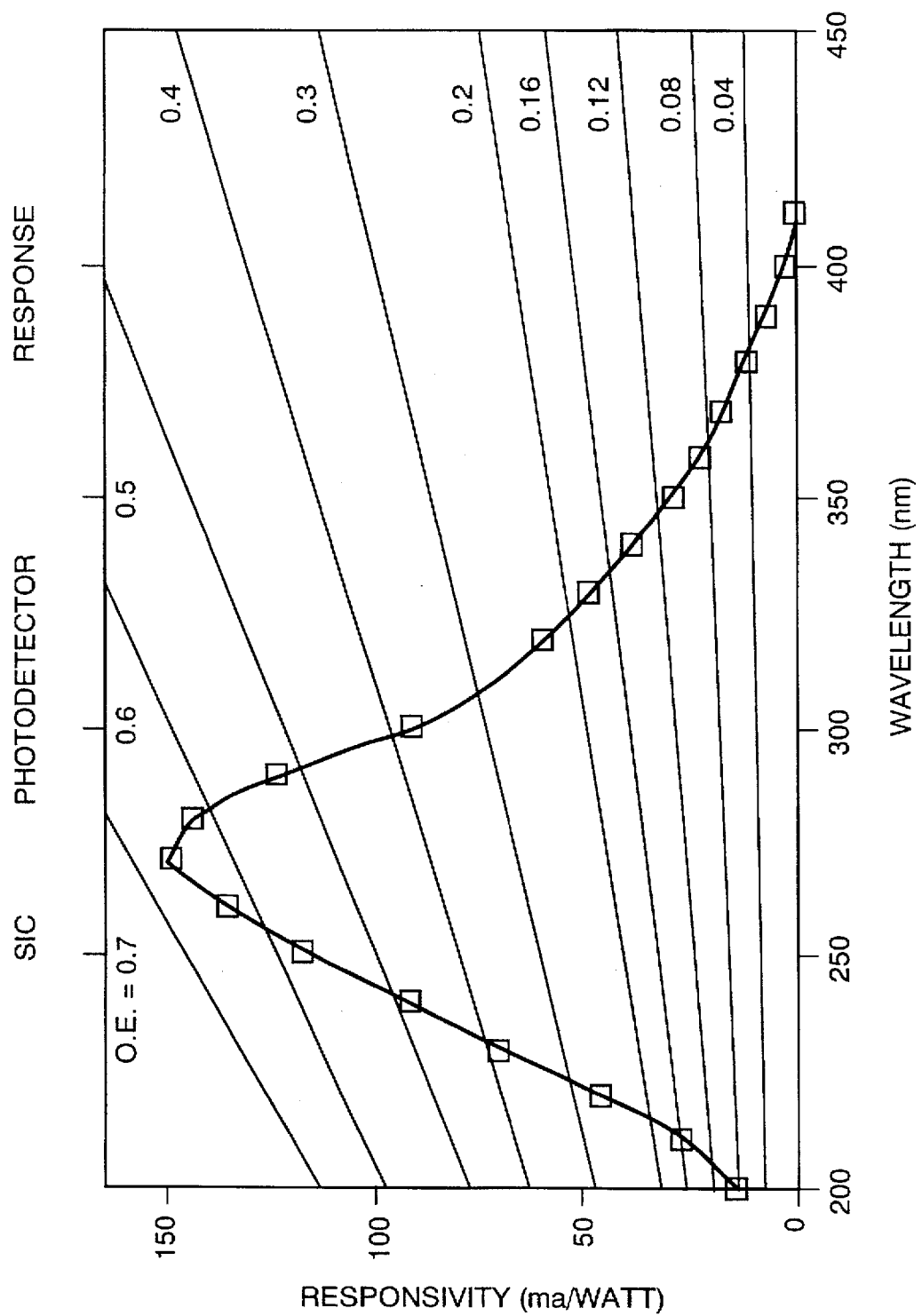
FIG. 9 is a graphical representation of the preferred photodiode response characteristics.

The detector means 52 is comprised of a detector housing 60 having a window or aperture 62 defined in and disposed near one end thereof, and a ceramic header 64 disposed on a Kovar flange 67 at the opposite end thereof. A suitable high temperature optical element 65 (e.g., a sapphire window in the exemplary embodiment of about 0.030 inches in thickness) is sealed with glass against the apertured end of the detector housing 60 for allowing the incident radiation to the detector element (photodiode 66). The ceramic header 64 (for example, KYOCERA Part No. A673, available from Kyocera Corporation of Kyoto, Japan) includes a silicon carbide photodiode 66 disposed and supported on one surface 64A of ceramic substrate 64B as shown in FIG. 6. A plurality of pin connectors are disposed about the periphery of the photodiode 66 to facilitate electrical attachment thereto via, e.g. wire bond pads 70A and 70B and connections 66A and 66B, as shown in FIG. 7. The silicon carbide photodiode 66 may be of the type shown and described in U.S. Pat. No. 5,093,576 to Edmond et al, the disclosure of which is hereby incorporated by reference. As shown in FIG. 9, such photodiode is responsive to electromagnetic radiation in the bandwidth of from about 200 to 400 nanometers with a peak responsivity (mA/Watt) in the range of from about 250 to 290 nanometers (i.e. ultraviolet). Photodiode 66 preferably is brazed to the substrate 64B in the manner that will be described shortly.

The photodiode 66 is a semiconductor which generates electron-hole pairs by photoconductive action. When these charge carriers are generated near a p-n junction, the electric field of the depletion layer at the junction separates the electrons from the holes, the movement of which generates a short circuit current or open circuit voltage. This can be used to create a signal corresponding to the presence and even the intensity of the combustion or afterburner flame.

Figure 8:
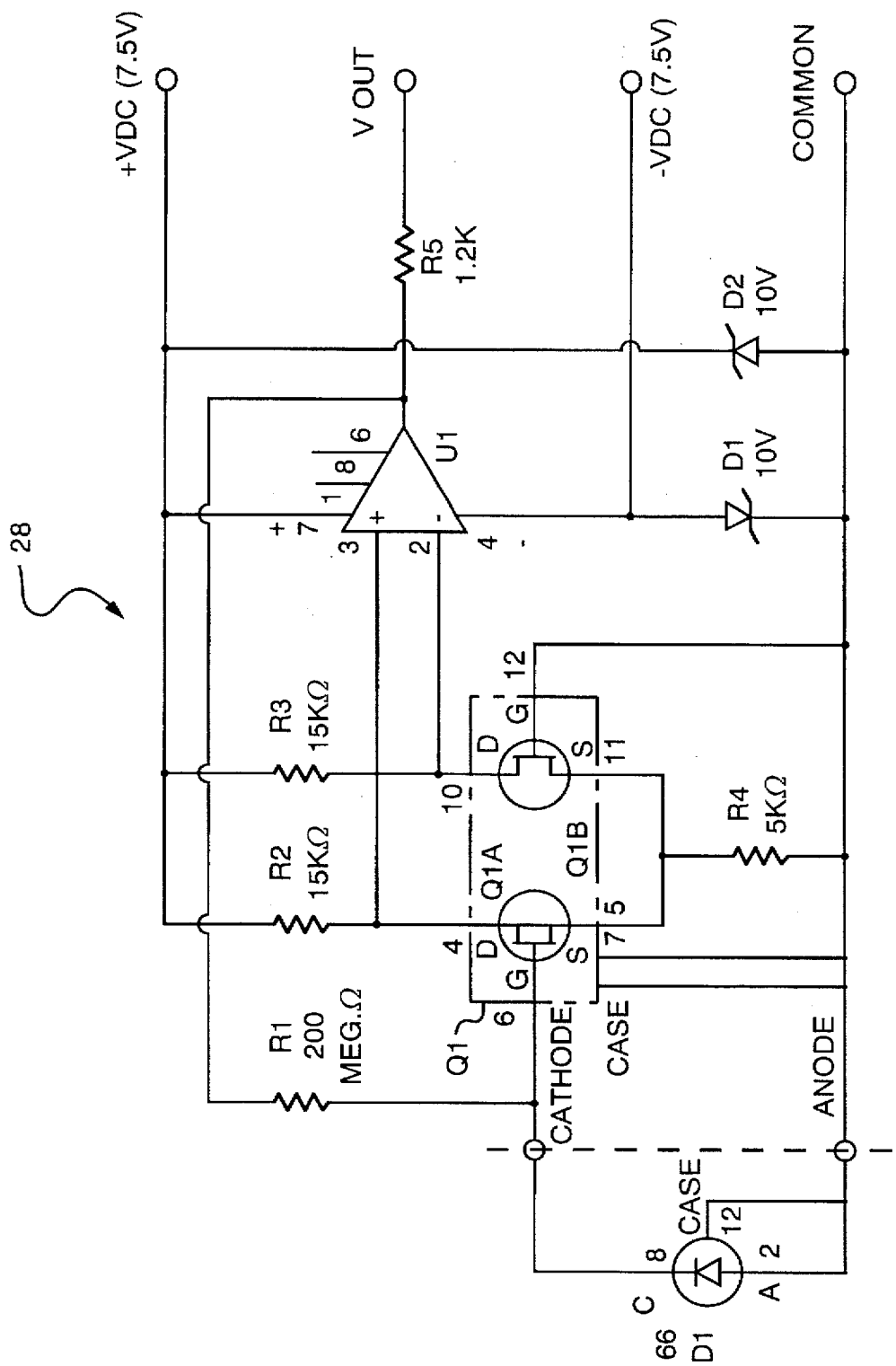
FIG. 8 is a circuit diagram of the sensor electronics.

Referring now to the circuit diagram of FIG. 8, the amplification circuitry provides an output voltage signal (VOUT). In a preferred embodiment, the system operates on the application of a positive voltage (+VDC) of approximately 7.5 Volts and a negative voltage (−VDC) of approximately −7.5 Volts. Accordingly, power consumption is vastly reduced in comparison with the prior art photodetectors described in the background of the specification (i.e. phototubes). The respective +VDC and −VDC are applied to an operational amplifier U1 at respective terminals 7 and 4. The −VDC is attached to common through a Zener diode D1. The +VDC is attached to common through a Zener diode D2 and applied to a dual JFET transistor Q1 comprises of Q1A and Q1B on one side at the respective drains 1, 2 at pin connectors 4, 10 and on the other side, the respective sources 5, 11 are grounded to common. The gate inputs 1, 2 at pin connectors 6 and 12 communicate with the respective cathode C and anode A of the photodiode 66. When a flame is present, electromagnetic radiation (ultraviolet) incident on photodiode 66 causes electrons to flow from the anode to the cathode (i.e. the gate current) and consequently the amount of current input to the operational amplifier U2 increases such that a measurable voltage V OUT is generated. Testing has demonstrated that with this system flame recognition (light-off or loss) occurs within 200 milliseconds. If desired, the output signal VOUT may be applied to appropriate signal conditioning circuitry for further processing, for example, to product a FADEC compatible signal in systems using FADEC electronics to control engine operation.

Figure 10:
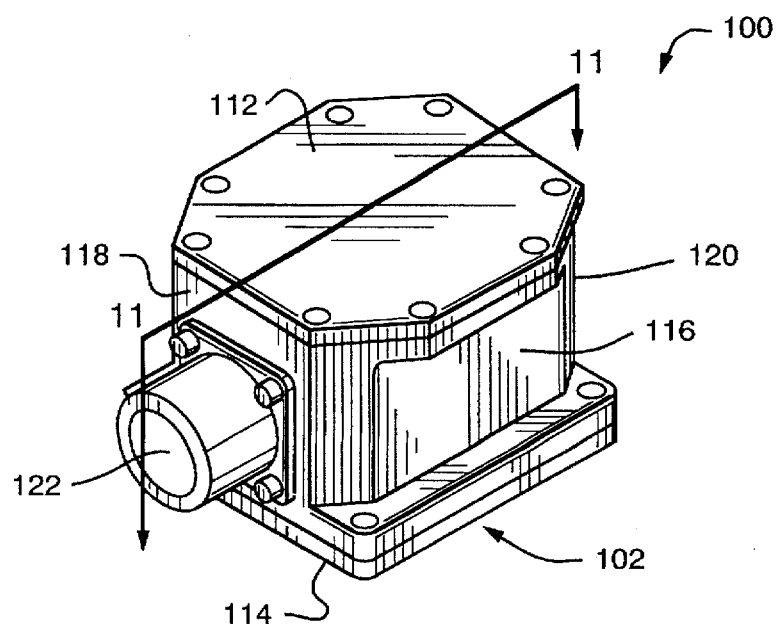
FIG. 10 is an isometric view of another embodiment of a sensor made in accordance with the present invention.
Figure 11:
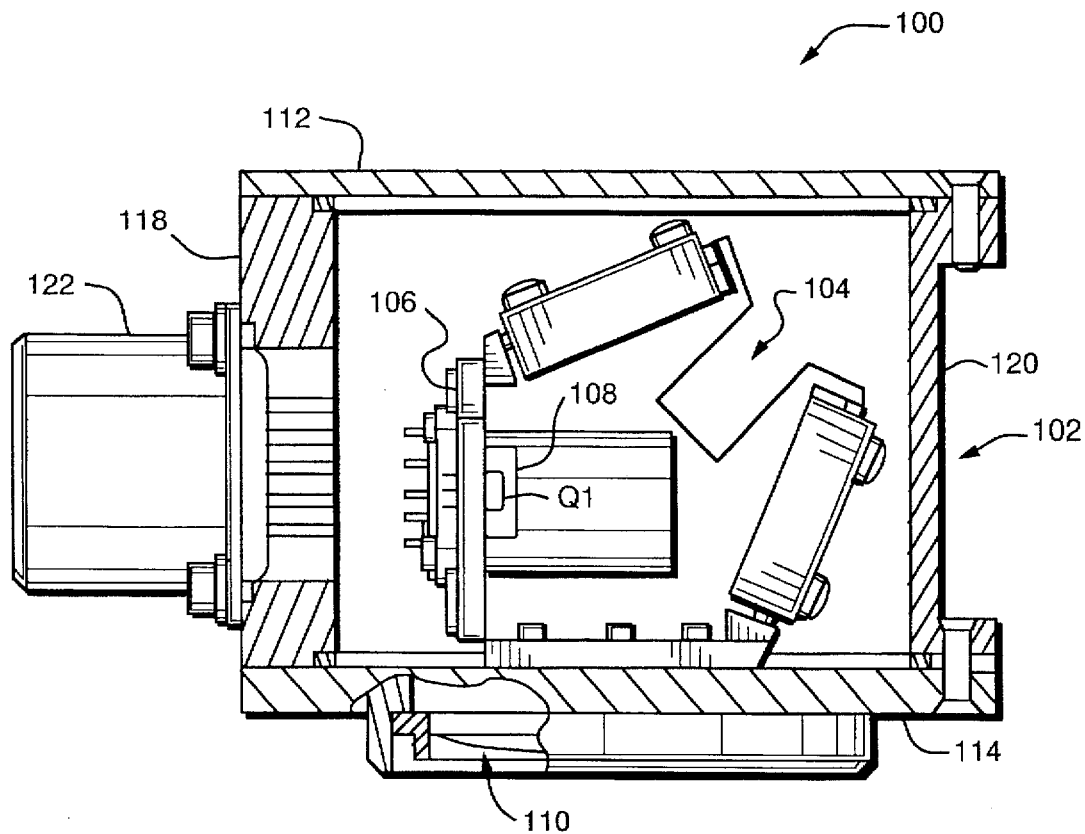
FIG. 11 is a partial sectional view along lines 11—11 in FIG. 10.
Figure 12:
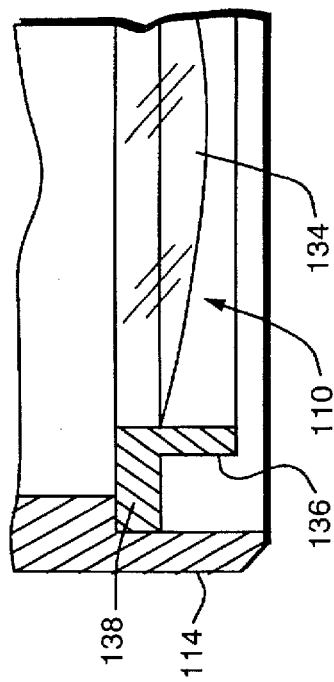
FIG. 12 is an enlarged detail of the optical assembly shown in FIG. 11.

Referring now to FIGS. 10–12, there is depicted another embodiment of a sensor 100, generally comprised of a sensor housing assembly 102, an optical block assembly 104, a detector mounting plate 106, a detector assembly 108 (see illustrations in FIGS. 5–7 and related description above with regard to the first embodiment) and a lens assembly 110.

Figure 13:
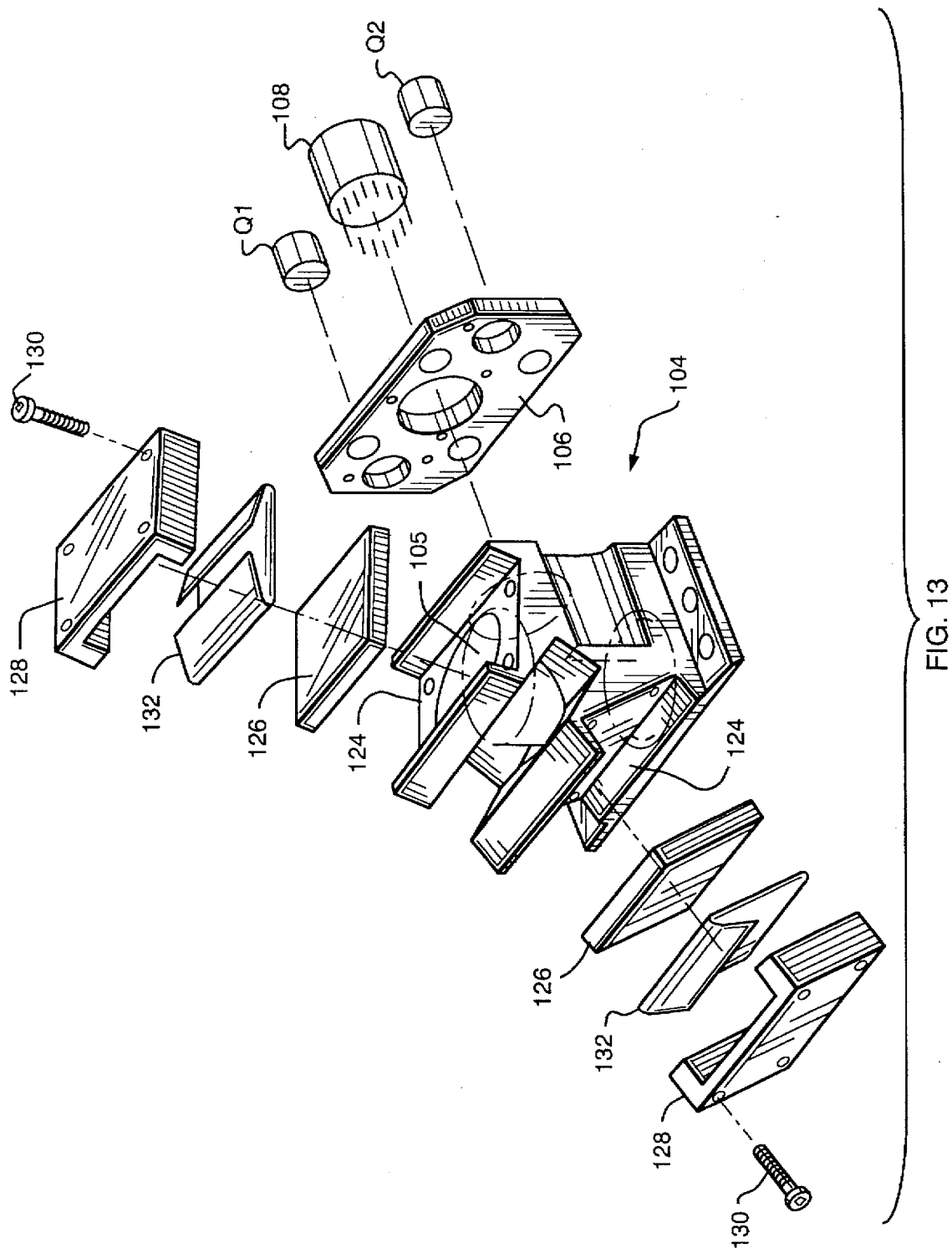
FIG. 13 is an exploded isometric view of the optical block assembly of the sensor shown in FIG. 10.

The housing 102 may be fabricated from stainless steel, and includes a top cover 112, an apertured bottom cover 114, a pair of opposed sides 116, an apertured front wall 118 and a rear wall 120, which collectively define a hollow interior. The apertured front wall 118 accommodates a connector 122 to facilitate an electrical connection between the detector assembly 108 and an external source. As shown in FIG. 13, the optical block assembly 104 may be formed with a pair of mirror receiving slots 124 in which a pair of corresponding mirrors 126 are disposed. Each mirror is mounted in slot 124 with a mirror cover 128 fastened to the optical block 104 with a plurality of fasteners 130. A spring 132 is situated between each mirror 126 and the U-shaped channel 134 of the cover 128. Optimally, each mirror 126 includes a dielectric coating which can be deposited on the reflective surface thereof by a multilayer sputter procedure. This coating absorbs and rejects certain wavelengths of radiation (i.e. above 270 nanometers, visible light) to minimize false sensor indications. Such filtering is critical in an afterburner application where the sensor 100 is disposed proximal to the nozzle of the gas turbine engine because sunlight can cause an erroneous indication of afterburner light-off. In this arrangement, it is desirable to filter out visible light by a factor of at least 104.5. It has been found that such filtering minimally reduces (by less than 10%) radiation in the ultraviolet bandwidth of from about 190 to 270 nanometers.

The optical block 104 defines a plurality of interconnected internal passageways 105 through which incident radiation, first directed through lens assembly 110, is reflected off-axis by the mirrors 126 to the detector assembly 108. Lens assembly 110, in a manner similar to the first embodiment described above and depicted in FIGS. 3 and 4, includes a sapphire lens 134 disposed within and laser welded to a lens holder 136, preferably fabricated from Kovar. Lens holder 136 has a flange 138 which facilitates attachment to the housing bottom 114 by welding.

The detector assembly 108 is constructed in accordance with the first embodiment described above and depicted in FIGS. 5–7. The detector 108 is situated on the mounting plate 116 such that it is optically aligned with mirrors 126 and the lens assembly 110. Similarly, the amplification circuitry similar to that shown and described with regard to the first embodiment (FIG. 8), may be incorporated on the detector mounting plate 106. In the exemplary embodiment of FIG. 13, JFET transistors Q1 and Q2 are each disposed on opposite sides of detector 108.

Figure 15:
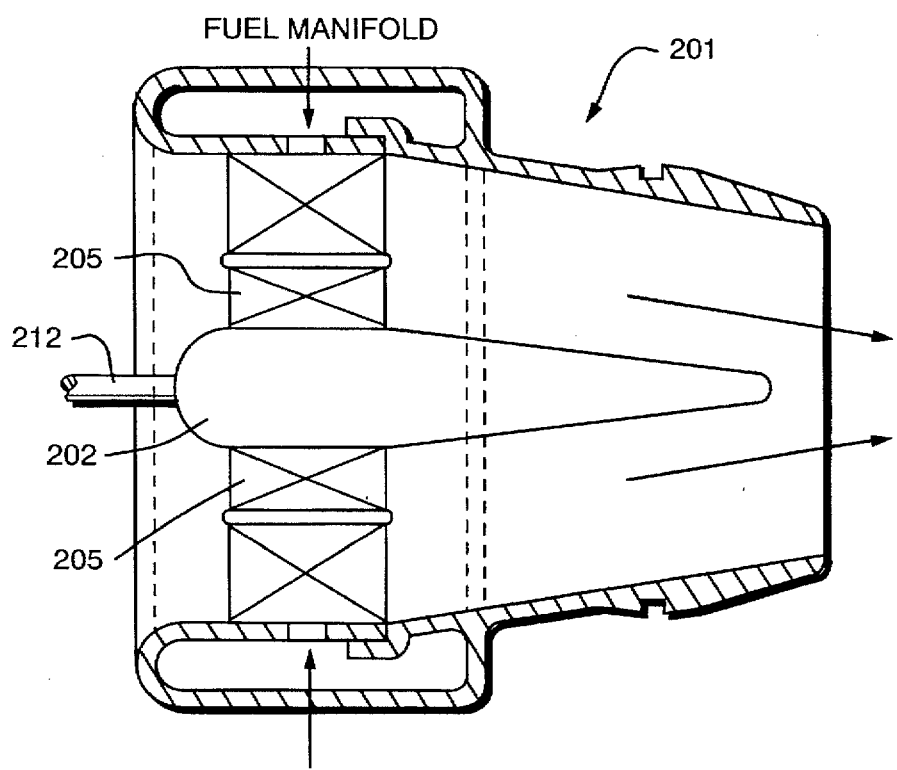
FIG. 15 is an enlarged detail view of a fuel/air premixer.
Figure 16:
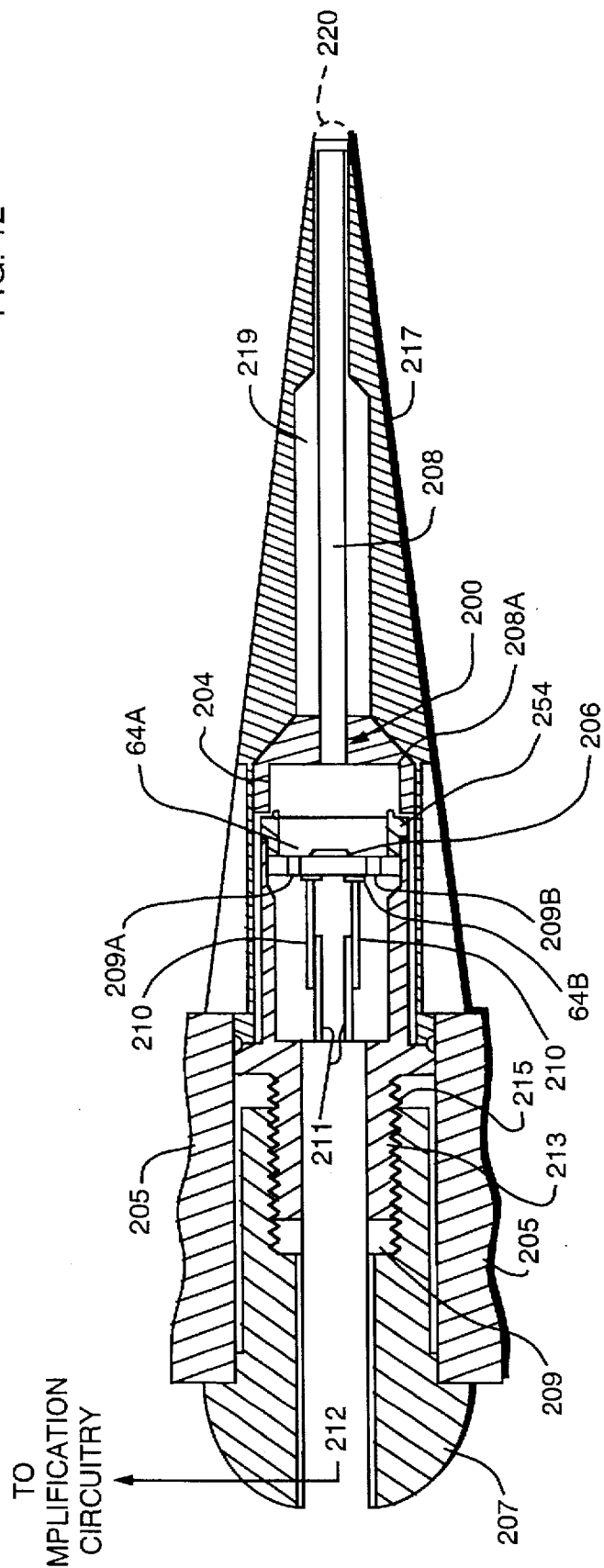
FIG. 16 is a sectional view of a center-body fairing of the fuel/air premixer shown in FIG. 15 having yet another embodiment of a sensor disposed therein.
Figure 14:
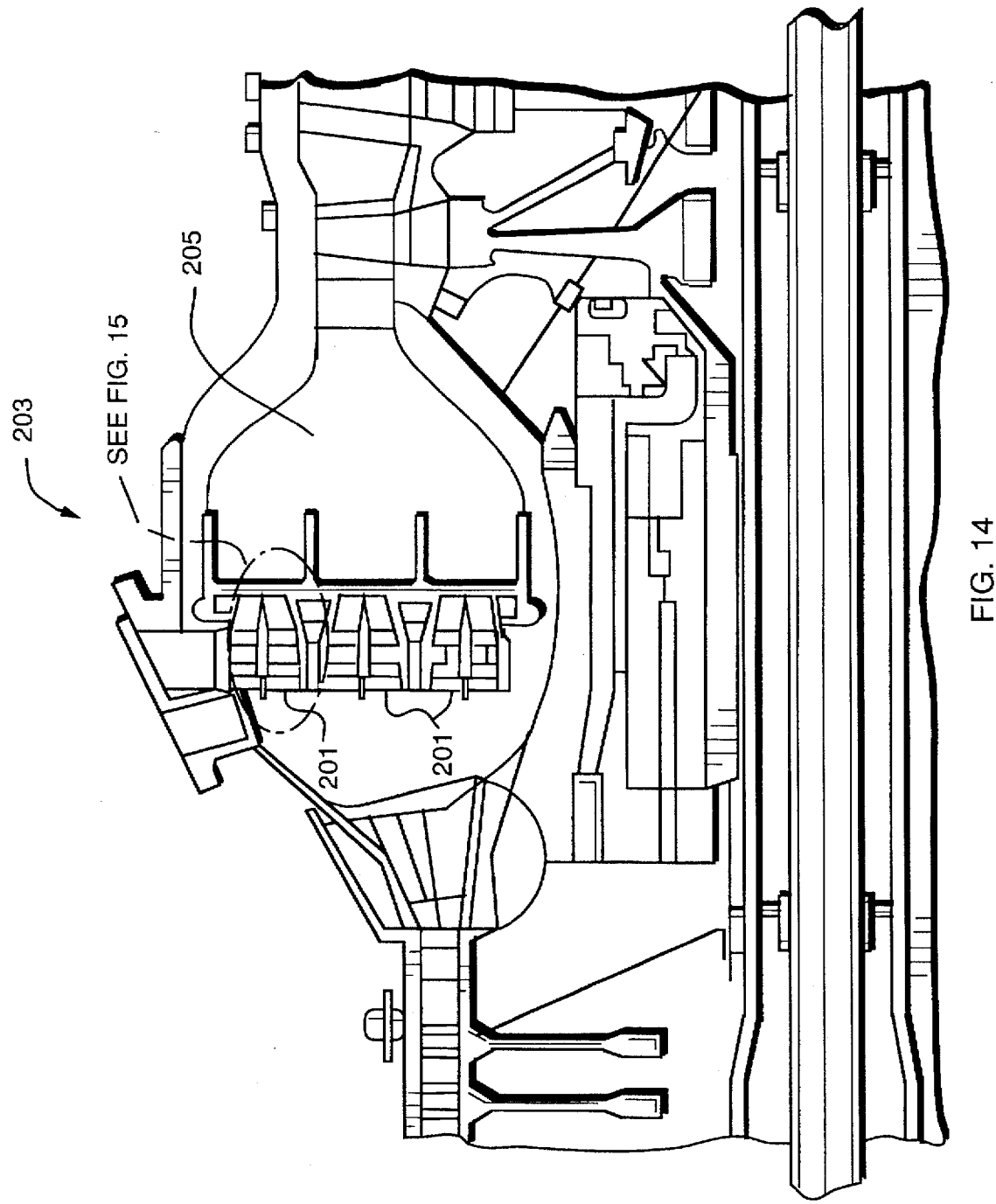
FIG. 14 is a partial schematic view of an aeroderivative gas turbine engine having a premixed combustion system.
Figure 17:
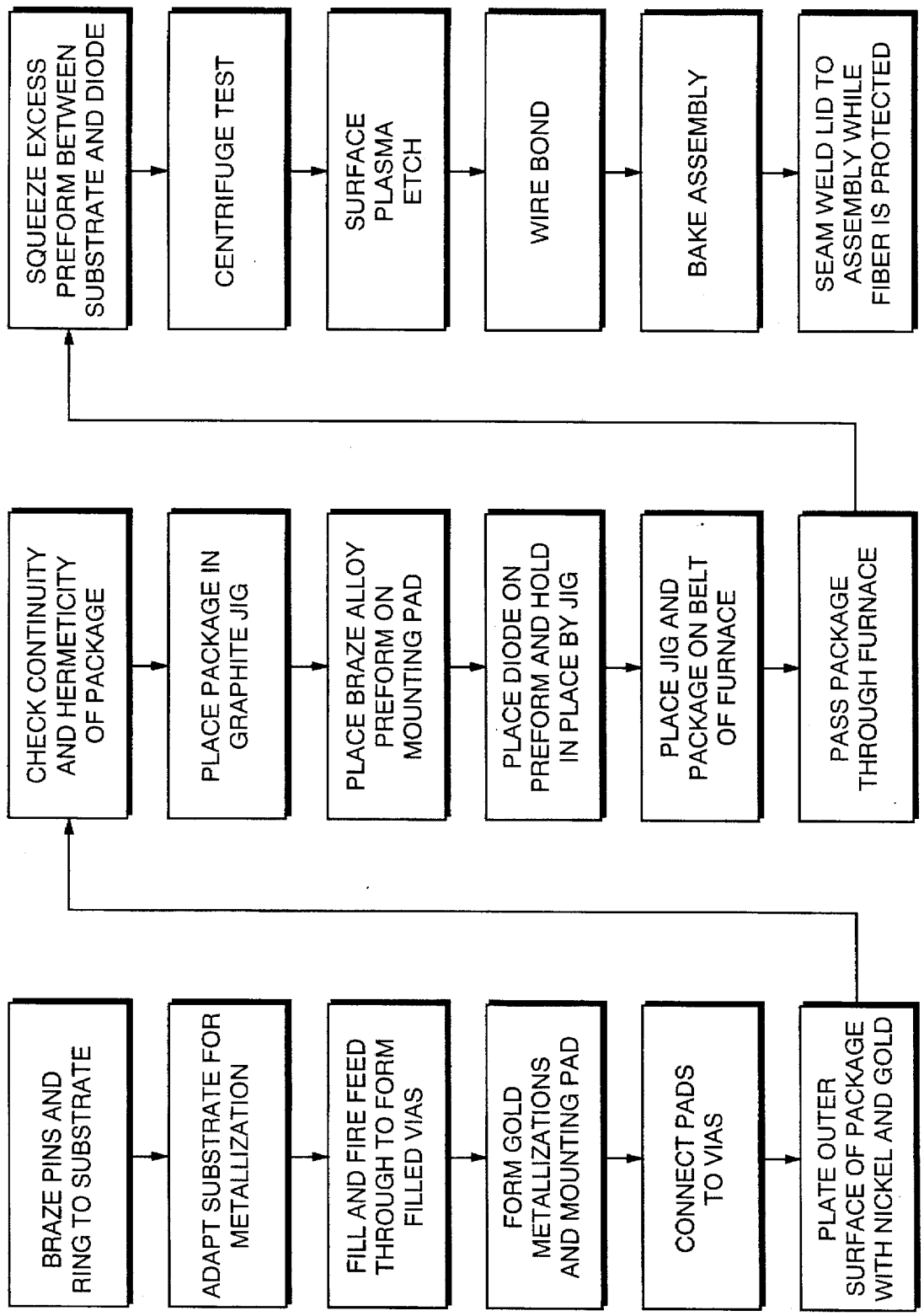
FIG. 17 is a flow chart of a preferred process of fabricating the sensor shown in FIG. 16.

Referring now to FIGS. 14–16, there is depicted yet another embodiment of a sensor 200 situated in the fuel-air premixer 201 of a premixed combustion system in an aeroderivative gas turbine engine 203. In such system, fuel and air are premixed through a set of axial-flow swirlers 205 that induce highly sheared counterrotating flow to mix the fuel and air prior to introduction into the combustion chamber 205 for greater engine efficiency. As shown in FIG. 15, a typical fuel-air premixer 201 includes a center-body fairing 202 modified to house an integral sensor disposed in the interior thereof.

Figure 5:
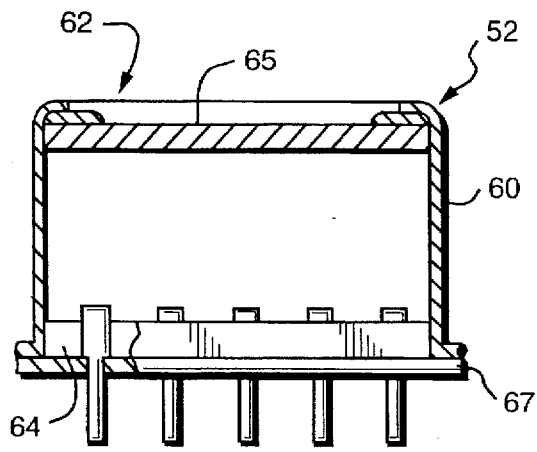
FIG. 5 is a sectional elevational view of the detector assembly.

The sensor 200 comprises a ceramic package assembly 204 having a detector assembly 206 similar to that shown in FIGS. 5–7. Assembly 204 comprises a molded white alumina (92 percent $Al_2O_3$) circular ceramic substrate 64B and seal ring 254. Alumina is chosen since it exhibits a relatively low dielectric constant and low thermal expansion characteristics. The seal ring is nickel-plated kovar and is brazed to the substrate with pure silver in a fluxless, hydrogen atmosphere. The detector 206 is connected to an elongated gold-coated silicon fiber-optic cable 208 exposed to the combustion chamber and extending axially through the center-body fairing 202 to communicate electromagnetic emissions from the combustion flame to the detector 206. The cable 208 is mounted to hybrid lid 208A which is made of Kovar. The center-body fairing 202 includes a cap 207 having an internal female thread 209 which is brazed to a base element 213 having corresponding male thread 215. A tailcone 217 is welded to base 213 and includes a hollow bore 219 and open end 220. A pair of pin connectors 210 are brazed to the wires 211 of a mineral-insulated or like cable 212 to communicate signals to and from amplification circuitry disposed at a remote location (not shown, but similar to the hardware depicted in FIG. 8). The operating principles of the sensor 200 are substantially the same as in the embodiments discussed previously.

Preferably, the following process is used to fabricate the sensor 200 of the present invention. Advantageously, it has been discovered that by using the following fabrication process the sensor of the present invention is better able to give accurate readings despite being subjected to prolonged high temperature conditions (e.g., temperatures in excess of 500 degrees Celsius for 20 or more hours).

Fabrication begins by forming the ceramic package 204. Preferably, in the same brazing operation, Kovar pins 210 and ring 254 are brazed to the other surface of the ceramic substrate 64B opposite to the surface 64A to which the diode is mounted. The front surface 64A of the substrate is adapted by conventional means to permit metallization using thick film techniques. The two electrical feed through holes 209A and 209B are filled with tungsten and the package 204 is fired to create filled vias in the feed throughs. Using conventional metallization techniques (e.g., conventional thick film screening metallization techniques and/or vacuum coating techniques), gold metallizations are formed on the surface 64A of the substrate to form circuit traces and pads. Preferably, sufficient gold is deposited in this step so that subsequent brazing does not cause the gold to totally alloy with the substrate, so as to permit later stitch-type wire-bonding of the various components of the photodiode and the other electronics of the sensor. It will be appreciated that the amount of gold to be deposited may vary depending upon design constraints. Thus, the amount of gold deposited must be determined empirically. Preferably, the circuit pads comprise a mounting pad (not shown) to which the SiC photodiode is mounted, and a wire-bonding pad. The pads are then each connected to the vias for transmitting photocurrent produced by the photodiode to the bottom surface of the substrate. Preferably, the outer surface of the package is then plated with electro-less nickel and gold mixture to provide oxidation resistance, and a braze-ready surface for the mounting pad.

After the continuity of the metallizations and hermeticity of the package are tested, the photodiode is then furnace brazed to the mounting pad using a braze alloy preform composition which preferably comprises 56 percent silver, 22 percent copper, 17 percent zinc, and 5 percent tin, by weight. This preform liquifies at about 650 degrees Celsius, which advantageously, permits the sensor to operate at temperatures in excess of 550 degrees Celsius while also offering improved bonding characteristics, without remelting the braze alloy.

Brazing of the photodiode to the substrate is accomplished in a fluxless, hydrogen atmosphere belt-furnace. First, the ceramic package is placed in a graphite nest and the braze alloy preform is placed onto the photodiode mounting pad. The photodiode is then placed onto the preform and is held in place by a graphite jig. The assembly consisting of the nest, ceramic package, and jig are then placed on the furnace belt and passed through the furnace. Excess preform is squeezed out between the mounting pad and the photodiode through application of pressure from the graphite jig, as the preform liquifies in the furnace. The temperature of the furnace and the exposure time of the assembly in the furnace are empirically determined to permit good wetting of photodiode to the substrate. After the assembly is removed from the furnace and allowed to cool sufficiently, the brazed photodiode and substrate are centrifuge testing to ensure that proper brazing of the photodiode to the substrate has been achieved.

The ceramic package is then subjected to a surface plasma etching to remove surface contamination to ready the package for wire bonding and sealing of the package. Wire bonding to interconnect the various circuit elements of the sensor is then accomplished, by e.g. use of scribing or stitching-type bonding techniques on the gold pads previously formed.

After wire bonding is complete, the assembly is baked to remove any surplus moisture therefrom. The hybrid lid is then fastened to the assembly. The hybrid lid is Kovar with the gold-coated silica optical fiber brazed into its center. It is attached to the assembly in a fluxless environment using conventional seam welding techniques, while the fiber is protected against being damaged through use of a covering sheath. Preferably, during its formation, the optical fiber is coated with gold as it is drawn from preform. The gold coating provides both an hermetic seal against the ambient environment and a high temperature bond.

It is therefore evident that there has been provided in accordance with the present invention, a high temperature gas stream optical flame sensor and method for making same that fully satisfies both the aims and objects herein before set forth. Although the foregoing discussion has focused on preferred embodiments of the present invention, many modifications, variations and alternatives are possible. Accordingly, the scope of the present invention is intended to embrace all such modifications, equivalents, and alternatives, and to only be limited as defined by the hereafter appended claims.

What is claimed is:

1. In a flame sensor for use in detecting flame in a combustion space, an optical processing apparatus comprising a plurality of mirrors positioned relative to said combustion space for being impinged upon by electromagnetic radiation generated by said flame in said combustion space and being adapted to substantially totally absorb a portion of said radiation within a certain wavelength range and to reflect a remaining portion of said radiation outside of said certain wavelength range.

2. In a sensor according to claim 1, wherein at least one of said mirrors includes a reflective surface having a coating deposited thereon adapted to substantially absorb said portion of said radiation within said certain range of wavelengths.

3. In a sensor according to claim 1, wherein said certain wavelength range includes a wavelength of visible light.

4. In a sensor according to claim 1, wherein said mirrors are also adapted to cause said remaining portion of said radiation outside of said certain wavelength range to be reflected off-axis.

5. In a sensor according to claim 4, wherein said apparatus further comprises a plurality of internal passageways for permitting the radiation reflected off-axis by said mirrors to pass therethrough.

6. In a sensor according to claim 1, wherein said certain wavelength range includes wavelengths greater than 270 nanometers.

7. In a sensor according to claim 6, wherein said mirrors are adapted to permit at least 90 percent of radiation having wavelengths between 190 and 270 nanometers to be reflected by said mirrors.

8. In a sensor according to claim 1, wherein said apparatus further comprises an assembly comprising a pair of receiving slots for mounting a pair of mirrors of said plurality of mirrors, and a pair of covers attached to said assembly for covering said pair of mirrors.

9. In a sensor according to claim 8, wherein one spring is disposed between one of said covers and one of said mirrors, and another spring is disposed between another of said covers and another of said mirrors.

10. In a sensor according to claim 9, wherein said covers include channels, and said springs are disposed in said channels.

11. In a sensor according to claim 10, wherein said channels are U-shaped.

12. In a sensor according to claim 1, wherein said mirrors are adapted to attenuate said portion of said radiation within said certain wavelength range by a factor of at least 104.5.

13. In a sensor according to claim 1, wherein said certain wavelength range comprises sunlight wavelengths.

* * * * *